May 9, 1944.   V. T. MOORE   2,348,260
CLEANING MEANS FOR HYDRAULIC CELLS
Filed Sept. 17, 1941
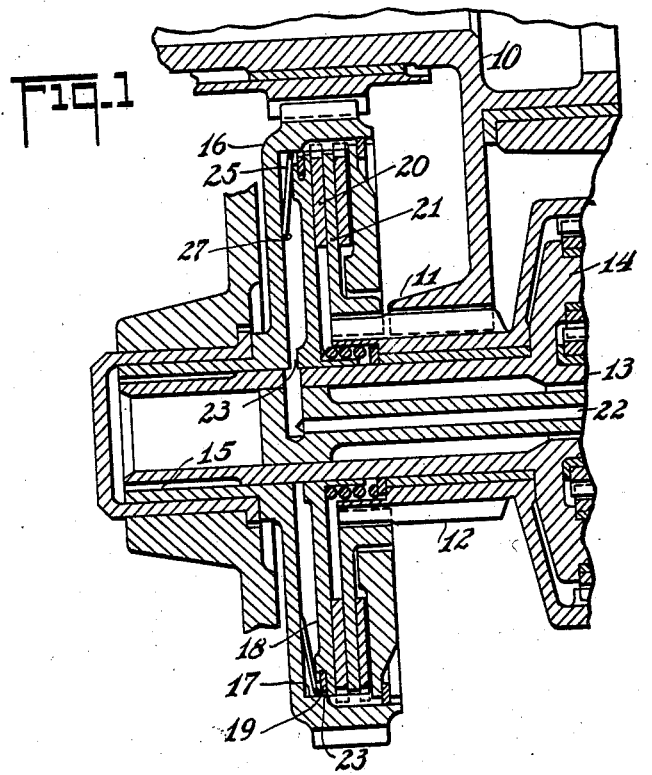
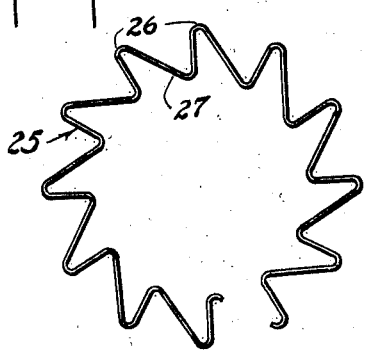
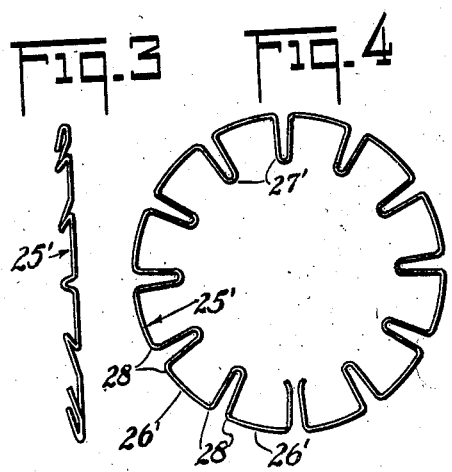
INVENTOR
VINCENT T. MOORE.
BY
ATTORNEY Patented May 9, 1944

2,348,260

UNITED STATES PATENT OFFICE 2,348,260

CLEANING MEANS FOR HYDRAULIC CELLS

Vincent T. Moore, Glen Rock, N. J., assignor to Wright Aeronautical Corporation, a corporation of New York Application September 17, 1941, Serial No. 411,205

8 Claims. (Cl. 121—38)

This invention relates to hydraulic cells and particularly to means for minimizing the clogging of such cells by foreign or solid matter.

As a brief background for the invention, considerable number of rotating piston-cylinder motors actuated by oil pressure have been used in internal combustion engines for aircraft, such motors having been used to actuate friction clutches for engaging multi ratio supercharger drives. A more complete showing of a supercharger drive of the character mentioned is contained in Chilton Patent No. 2,034,087 and a sufficient portion of this gear transmission is shown in the drawing of this application to indicate existing structure.

In general, a hydraulic cylinder is rotated about its own axis at high speed and is at times subjected to fluid pressure for operation of a piston slidable in the cylinder but in turn enforces engagement of a friction clutch. Due to the rotation of the cylinder, solid matter heavier than the pressure fluid may be centrifuged through the periphery of the cylinder whereat it may deposit in a hard layer which interferes with proper reciprocation of the piston in the cylinder. The present invention has for a primary object the prevention of solid deposits of foreign matter in an environment of this kind, a further object of the invention being to provide means which may be inserted in existing hydraulic cylinders for overcoming tendencies toward the deposit of solid matter.

Further objects of the invention will become apparent in reading the annexed detailed description in connection with the drawing, in which:

Fig. 1 is a longitudinal section through a portion of a rotating hydraulic clutch assembly;

Fig. 2 is an end elevation of a cleaning spring therefor;

Fig. 3 is a side elevation of an alternate form of cleaning spring; and

Fig. 4 is an end elevation of the alternate type of cleaning spring.

Referring first to Fig. 1, I show a driveshaft 10 which may be a crankshaft extension of an aircraft engine, this shaft carrying a gear 11 meshed with a pinion 12 borne on a layshaft 13 which includes gear mechanism 14 not particularly relevant to the invention. Rigid with the layshaft 13, through splines 15, is a gear 16 formed as a hydraulic cylinder 17 within which is axially slidable a piston 18 having a piston ring 19 at its periphery and engaging the cylinder wall. This piston at times may engage clutch plates 20 splined to the rim of the gear 16, these plates alternating with plates 21 splined on the pinion 12. A pressure fluid passage 22 leads through the layshaft to a port 23 entering the cylinder 17. By admitting pressure fluid through the passage 22, the piston is forced against the clutch plates to engage the clutch and to afford direct drive from the pinion 12 to the gear 16. When fluid pressure is cut off from the cylinder, the pressure due to centrifugal force, developed by the rotating gear, causes leakage of the pressure fluid through small notches 24 in the periphery of the ring 19 whereby the fluid in the hydraulic cell bleeds therefrom to allow disengagement of the clutch plates 20 and 21.

It has been found in practice that the pressure fluid used for actuating the clutch contains small amounts of foreign matter which are centrifuged against the surface of the cylinder 17, and if these are not broken up for scavenging through the ring notches 27, disengagement of the clutch when fluid pressure is cut off may be prevented due to the inability of the piston 18 to move freely in the cylinder 17. Accordingly, I place a serrated spring 25 in the cylinder cavity said spring having portions engaging the cylinder wall so that when the clutch is actuated either for engagement or disengagement, the outer ring portions 26 scrape against the cylinder wall to break up any accumulations of foreign matter thereon. Since this foreign matter is of very fine grain, it will pass readily from the ring notches 23 if it is broken up. If not broken up, however, it will cake against the cylinder wall and defy free operation of the clutch. The serrated spring 25 may take the form of the spring shown in Figs. 3 and 4 and numbered 25', this spring having segmental portions 26' each struck on a radius greater than that of the cylinder, so that segment ends 28 bear on the cylinder wall while the segment mid-portions are clear of the wall at low rotational speeds of the gear. When the gear is speeded up, the resilient segments, under the influence of centrifugal force, are deformed to contact the cylinder wall. Accordingly, for every time the gear is speeded and slowed, the segments move into and out of cylinder wall contact to break up solid matter deposits adjacent thereto. The inward projections 27 and 27' of the springs shown in Figs. 2 and 4 serve two functions—one, to give the ring considerable resilience so that it will engage the cylinder wall when the cylinder is rotating at speed, and two, these projections 27 and 27' are bent from the normal plane of the spring ring periphery so as to engage the end of the cylinder, as shown in Fig. 1. Outer portions of the projections, close to the cylinder periphery, bear upon the piston 18 which provides a fulcrum by which, when the piston is moved axially in the cylinder, the outer portions 26 and 26' of the spring ring are moved along the cylinder wall a distance somewhat greater than the axial movement of the piston alone thereby clearing the cylinder wall of foreign matter deposits through a greater area than the normal area over which the piston periphery moves on the cylinder wall. The projections also serve to hold the spring ring close to the end of the piston.

Figs. 2 and 4 show merely two of many possible forms of spring scraper rings to accomplish the purposes set forth, and the invention is not to be considered as restricted to the specific forms of scraper rings shown.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a piston-cylinder motor rotating on its own axis and having means to feed pressure fluid thereto, said piston being reciprocable in said cylinder by said pressure fluid, means to break up accumulations of solid matter centrifuged out of the fluid onto the cylinder wall comprising an annulus peripherally bearing on the cylinder wall adjacent said piston, and inward resilient projections on said annulus bearing on the cylinder head, whereby upon reciprocation of the piston in the cylinder, said annulus is caused to move over the cylinder surface.

2. In a piston-cylinder motor rotating on its own axis and having means to feed pressure fluid thereto, said piston being reciprocable in said cylinder by said pressure fluid, means to break up accumulations of solid matter centrifuged out of the fluid onto the cylinder wall comprising a waved spring wire within said cylinder having outer portions bearing on the piston head and cylinder surface and having inner portions bearing on the cylinder head, whereby, upon reciprocation of the piston in the cylinder, said outer portions are forced to move over the cylinder surface.

3. In a piston-cylinder motor rotating on its own axis and having means to feed pressure fluid thereto, said piston being reciprocable in said cylinder by said pressure fluid, means to break up accumulations of solid matter centrifuged out of the fluid onto the cylinder wall comprising a circumferentially waved spring element within said cylinder having portions engaging the cylinder wall, having other portions fulcrumed on the piston head, and having still other portions bearing on the cylinder head, whereby upon piston reciprocation, said cylinder surface contacting portions are forced to move over the cylinder surface and are forced to move relative to said piston.

4. In a rotating hydraulic cylinder subject to stopping and starting and having a piston reciprocable relative thereto, a resilient, substantially annular member within the cylinder and movable with said piston, said member being movable radially into and out of contact with the cylinder wall in response to great or small centrifugal force accordingly as the cylinder rotates fast or slow.

5. In a piston-cylinder motor rotating on its own axis and having means to feed a pressure fluid thereto, means to break up accumulations of solid matter centrifuged out of the fluid onto the cylinder wall comprising a resilient annular element movable with the piston along the cylinder wall and disposed adjacent the cylinder head, said element being expandible into and contractible out of cylinder wall engagement under the influence of greater or lesser centrifugal force resulting from high or low speed cylinder rotation.

6. In a hydraulic mechanism, a cylinder rotating on its own axis, a piston therein rotatable therewith and reciprocable relative thereto, and a substantially annular resilient member disposed between the head ends of the piston and cylinder respectively, said member having its inner peripheral portions engaging the cylinder head while its outer peripheral portions engage the cylinder walls adjacent the piston head.

7. In a piston-cylinder motor rotating on its own axis, fluid pressure means for operating said piston within said cylinder, a spring-like element adapted to break up accumulations of solid matter on the cylinder wall, said element engaging the cylinder wall and being disposed between and contacting both the cylinder head and piston head.

8. In a piston-cylinder motor rotating on its own axis and having means to feed fluid pressure thereto, said piston being reciprocable within said cylinder in response to the application or the relief of said fluid pressure to control the speed of rotation of said cylinder, means to break up accumulations of solid matter on the cylinder wall, said means comprising an expandible resilient member within the cylinder bore and having only partial contact with the cylinder wall at low cylinder speeds, said member being radially expandible into contact with a relatively large part of the cylinder wall circumference at high cylinder speeds.

VINCENT T. MOORE.